US012153692B2

(12) United States Patent
Bang et al.

(10) Patent No.: US 12,153,692 B2
(45) Date of Patent: Nov. 26, 2024

(54) METHOD OF CONTROLLING CLIPBOARD AND ELECTRONIC DEVICE FOR PERFORMING THE SAME

(71) Applicant: SAMSUNG ELECTRONICS CO., LTD., Suwon-si (KR)

(72) Inventors: Seul Bang, Suwon-si (KR); Hansang Song, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 221 days.

(21) Appl. No.: 17/824,533

(22) Filed: May 25, 2022

(65) Prior Publication Data

US 2022/0292204 A1 Sep. 15, 2022

Related U.S. Application Data

(63) Continuation of application No. PCT/KR2022/001476, filed on Jan. 27, 2022.

(30) Foreign Application Priority Data

Mar. 15, 2021 (KR) .................. 10-2021-0033190

(51) Int. Cl.
G06F 21/60 (2013.01)
G06F 3/0481 (2022.01)
G06F 9/54 (2006.01)

(52) U.S. Cl.
CPC .......... G06F 21/604 (2013.01); G06F 3/0481 (2013.01); G06F 9/543 (2013.01)

(58) Field of Classification Search
CPC ....... G06F 21/604; G06F 3/0481; G06F 9/543
See application file for complete search history.

(56) References Cited

U.S. PATENT DOCUMENTS

| 9,053,333 | B2 | 6/2015 | Furuichi et al. |
| 9,098,713 | B2 | 8/2015 | Lee |
| 9,246,948 | B2 | 1/2016 | Jaiswal et al. |
| 9,672,366 | B1* | 6/2017 | Khetawat ............... G06F 9/543 |
| 9,728,107 | B1* | 8/2017 | Begen ..................... G06F 21/10 |

(Continued)

FOREIGN PATENT DOCUMENTS

| JP | 5481308 B2 | 4/2014 |
| KR | 10-2003-0087874 A | 11/2003 |

(Continued)

OTHER PUBLICATIONS

International Search Report dated May 10, 2022 issued by the International Searching Authority in counterpart International Application No. PCT/KR2022/001476 (PCT/ISA/210).

(Continued)

Primary Examiner — Vance M Little
(74) Attorney, Agent, or Firm — Sughrue Mion, PLLC

(57) ABSTRACT

A method of controlling a clipboard and an electronic device for performing the method are provided. The electronic device includes a display; a volatile memory including a first storage area configured to store a clipboard including existing data; an input interface; and at least one processor communicably coupled to the display, the volatile memory, and the input interface, the at least one processor being configured to: detect a read access to the existing data included in the clipboard by an application; determine whether the existing data includes personal information; and based on determining that the existing data includes the personal information, determine whether to allow the read access to the existing data by the application, based on a user input provided through the input interface.

19 Claims, 10 Drawing Sheets

(56) References Cited

U.S. PATENT DOCUMENTS

| | | | | |
|---|---|---|---|---|
| 2007/0061747 A1* | 3/2007 | Hahn | ............... | G06F 9/543 |
| | | | | 715/764 |
| 2008/0256601 A1* | 10/2008 | Dutta | ............ | G06F 21/6209 |
| | | | | 726/3 |
| 2014/0304839 A1* | 10/2014 | Hansen | ............ | G06F 21/6209 |
| | | | | 726/29 |
| 2019/0227857 A1 | 7/2019 | Koszek | | |

FOREIGN PATENT DOCUMENTS

| | | |
|---|---|---|
| KR | 10-0943318 B1 | 2/2010 |
| KR | 10-1064143 B1 | 9/2011 |
| KR | 10-1264792 B1 | 5/2013 |
| KR | 10-1590626 B1 | 2/2016 |
| WO | 2017/162081 A1 | 9/2017 |

OTHER PUBLICATIONS

Communication issued Jul. 10, 2024 by the European Patent Office in the European Patent application No. 22771597.6.

Disclosed Anonymously, "System clipboard enhancement to prevent sensitive data exposure", ip.com, IPCOM000216639D, Apr. 11, 2012. (2 pages total).

Disclosed Anonymously, "Buffer management for sensitive data", ip.com, IPCOM000259815D, Sep. 19, 2019. (5 pages total).

* cited by examiner

FIG. 2

Program 240

Application 246

| Home 251 | Dialer 253 | SMS/MMS 255 | IM 257 | Browser 259 | Camera 261 | Alarm 263 |
|---|---|---|---|---|---|---|
| Contact 265 | Voice recognition 267 | Email 269 | Calendar 271 | Media player 273 | Album 275 | Watch 277 |
| Health 279 | Environmental information 281 | | | | | |

Middleware 244

| Application manager 201 | Window manager 203 | Multimedia manager 205 | Resource manager 207 | Power manager 209 |
| Database manager 211 | Package manager 213 | Connectivity manager 215 | Notification manager 217 | Location manager 219 |
| Graphic manager 221 | Security manager 223 | Telephony manager 225 | Voice recognition manager 227 | |

OS 242

METHOD OF CONTROLLING CLIPBOARD AND ELECTRONIC DEVICE FOR PERFORMING THE SAME

CROSS-REFERENCE TO RELATED APPLICATIONS

This application is a bypass continuation application of International Application No. PCT/KR2022/001476, filed on Jan. 27, 2022, which claims priority to Korean Patent Application No. 10-2021-0033190, filed on Mar. 15, 2021, in the Korean Intellectual Property Office, the disclosures of which are incorporated by reference herein in their entireties.

BACKGROUND

1. Field

The disclosure relates to a technology of protecting personal information stored in a clipboard.

2. Description of Related Art

Data stored in a clipboard may be vulnerable to an external access. To protect data stored in a clipboard, various protection methods are implemented for each operating system (OS). For example, Android™ operating system after Android 10 version does not allow applications other than an application that is currently in a foreground state to access a clipboard and restricts an external access to the clipboard itself iOS™ operating system after iOS 14 version protects data stored in a clipboard by notifying a user of an access to the clipboard every time the access to the clipboard is detected.

SUMMARY

Provided are an electronic device for increasing protection of personal information stored in a clipboard by managing an access to the personal information.

According to an aspect of the disclosure, there is provided an electronic device including: a display; a volatile memory including a first storage area configured to store a clipboard including existing data; an input interface; and at least one processor communicably coupled to the display, the volatile memory, and the input interface, the at least one processor being configured to: detect a read access to the existing data included in the clipboard by an application; determine whether the existing data includes personal information; and based on determining that the existing data includes the personal information, determine whether to allow the read access to the existing data by the application, based on a user input provided through the input interface.

The electronic device may further include a non-volatile memory, wherein the at least one processor may be further configured to determine whether the existing data includes the personal information by data scanning of the clipboard, based on personal information format data stored in the non-volatile memory, and the personal information format data may include data associated with a format in which personal information is represented or stored.

The at least one processor may be further configured to store metadata indicating that the existing data includes the personal information when the existing data includes the personal information.

The at least one processor may be further configured to determine whether the existing data includes the personal information by data scanning of the clipboard, wherein the volatile memory may further include a second storage area on which the data scanning is not performed, and the at least one processor may be further configured to move the existing data on which the data scanning is performed to the second storage area on which the data scanning is not performed.

The at least one processor may be further configured to, based on determining that the existing data includes the personal information, control the display to display the existing data included in the clipboard using a window manager included in middleware, based on another user input provided through the input interface.

The at least one processor may be further configured to, based on determining to not allow the read access by the application, delete the existing data from the clipboard and store the existing data in a third storage area that is not accessible via the clipboard.

The at least one processor may be further configured to, based on determining to allow the read access by the application, allow the read access to the existing data by the application once or always, delete the existing data from the clipboard, and store the existing data in a third storage area that is not accessible via the clipboard, based on another user input provided through the input interface.

The at least one processor may be further configured to, based on determining to allow the read access by the application, allow the read access to the existing data by the application, delete the existing data from the clipboard, encrypt the existing data, and store the encrypted existing data in a third storage area that is not accessible via the clipboard, based on another user input provided through the input interface.

According to an aspect of an example embodiment, there is provided an electronic device including: a volatile memory including a first storage area configured to store a clipboard; an input interface; and at least one processor communicably coupled to the volatile memory and the input interface, the at least one processor being configured to: detect a write access of input data to the clipboard by an application; determine whether the input data includes personal information; and based on determining that the input data includes the personal information, determine whether to allow the write access by the application, based on a user input provided through the input interface.

The electronic device may further include a non-volatile memory, wherein the at least one processor may be further configured to determine whether the input data includes personal information based on personal information format data stored in the non-volatile memory, and the personal information format data may include data associated with a format in which personal information is represented or stored.

The at least one processor may be further configured to, based on determining that the input data includes the personal information, store metadata indicating that the input data includes the personal information.

The at least one processor may be further configured to, based on the application being executed in a background, determine one of whether to allow the write access to the clipboard by the application once, whether to allow the write access to the clipboard by the application always, and whether to disallow the write access, based on the user input provided through the input interface.

The at least one processor may be further configured to, based on determining to allow the write access by the application, store metadata indicating that the input data is disposable data, and store existing data of the clipboard in a third storage area that is not accessible via the clipboard, based on the user input provided through the input interface.

The at least one processor may be further configured to, based on determining to allow the write access by the application, store existing data of the clipboard in a third storage area that is not accessible via the clipboard, based on the user input provided through the input interface.

The at least one processor may be further configured to, based on determining to allow the write access by the application, store the input data in the clipboard.

According to an aspect of an example embodiment, there is provided a method of controlling access to a clipboard, the method including: detecting, by a processor, a read access to existing data included in the clipboard by an application, the clipboard being stored in a volatile memory; determining, by the processor, whether the existing data includes personal information; and based on determining that the existing data includes the personal information, determining, by the processor, whether to allow the read access to the existing data by the application, based on a user input provided through an input interface.

The determining whether the existing data includes the personal information includes determining whether the existing data includes the personal information based on personal information format data stored in a non-volatile memory.

The method may further include: based on determining that the existing data includes the personal information, storing metadata indicating that the existing data includes the personal information.

The determining whether the existing data includes the personal information may include determining whether the existing data includes the personal information through data scanning of the clipboard, and the method may further include moving existing data on which the data scanning is performed to a second storage area included in the volatile memory on which the data scanning is not performed.

BRIEF DESCRIPTION OF THE DRAWINGS

The above and other aspects, features, and advantages of certain embodiments of the present disclosure will be more apparent from the following detailed description, taken in conjunction with the accompanying drawings, in which:

FIG. 2 is a block diagram illustrating a program according to various example embodiments;

DETAILED DESCRIPTION

Figure 1:
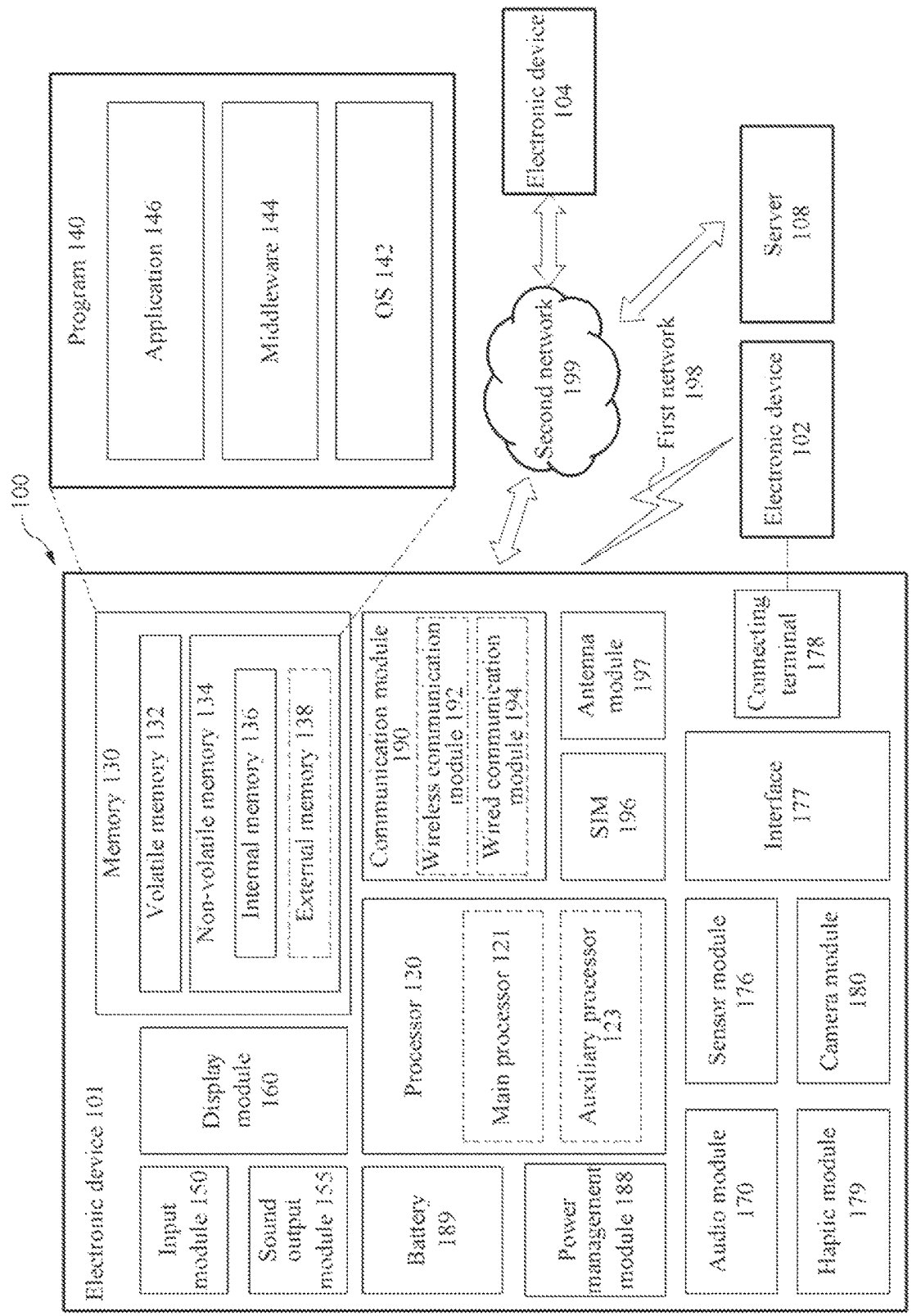
FIG. 1 is a block diagram illustrating an electronic device in a network environment according to various example embodiments.

Hereinafter, example embodiments will be described in detail with reference to the accompanying drawings. When describing the example embodiments with reference to the accompanying drawings, like reference numerals refer to like elements and a repeated description related thereto will be omitted.

FIG. 1 is a block diagram illustrating an electronic device 101 in a network environment 100 according to various example embodiments. Referring to FIG. 1, the electronic device 101 in the network environment 100 may communicate with an electronic device 102 via a first network 198 (e.g., a short-range wireless communication network), or communicate with at least one of an electronic device 104 or a server 108 via a second network 199 (e.g., a long-range wireless communication network). According to an example embodiment, the electronic device 101 may communicate with the electronic device 104 via the server 108. According to an example embodiment, the electronic device 101 may include a processor 120, a memory 130, an input module 150, a sound output module 155, a display module 160, an audio module 170, and a sensor module 176, an interface 177, a connecting terminal 178, a haptic module 179, a camera module 180, a power management module 188, a battery 189, a communication module 190, a subscriber identification module (SIM) 196, or an antenna module 197. In some example embodiments, at least one of the components (e.g., the connecting terminal 178) may be omitted from the electronic device 101, or one or more other components may be added in the electronic device 101. In some example embodiments, some of the components (e.g., the sensor module 176, the camera module 180, or the antenna module 197) may be integrated as a single component (e.g., the display module 160).

The processor 120 may execute, for example, software (e.g., a program 140) to control at least one other component (e.g., a hardware or software component) of the electronic device 101 connected to the processor 120, and may perform various data processing or computation. According to an example embodiment, as at least a part of data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an example embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). According to an example embodiment, the auxiliary processor 123 (e.g., an ISP or a CP) may be implemented as a portion of another component (e.g., the camera module 180 or the communication module 190) that is functionally related to the auxiliary processor 123. According to an example embodiment, the auxiliary processor 123 (e.g., an NPU) may include a hardware structure specified for artificial intelligence model processing. An artificial intelligence model may be generated by machine learning. Such learning may be performed by, for example, the electronic device 101 in which artificial intelligence is performed, or performed via a separate server (e.g., the server 108). Learning algorithms may include, but are not limited to, for example, supervised learning, unsupervised learning, semi-supervised learning, or reinforcement learning. The AI model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The AI model may additionally or alternatively include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored as software in the memory 130, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker and/or a receiver. The speaker may be used for general purposes, such as playing multimedia or playing record. The receiver may be used to receive an incoming call. According to an example embodiment, the receiver may be implemented separately from the speaker or as a part of the speaker.

The display module 160 may visually provide information to the outside (e.g., a user) of the electronic device 101. The display module 160 may include, for example, a control circuit for controlling a display, a hologram device, or a projector and control circuitry to control a corresponding one of the display, the hologram device, and the projector. According to an example embodiment, the display module 160 may include a touch sensor adapted to detect a touch, or a pressure sensor adapted to measure the intensity of force incurred by the touch.

The audio module 170 may convert a sound into an electric signal or vice versa. According to an example embodiment, the audio module 170 may obtain the sound via the input module 150 or output the sound via the sound output module 155 or an external electronic device (e.g., the electronic device 102 such as a speaker or a headphone) directly or wirelessly connected to the electronic device 101.

The sensor module 176 may detect an operational state (e.g., power or temperature) of the electronic device 101 and/or an environmental state (e.g., a state of a user) external to the electronic device 101, and generate an electric signal or data value corresponding to the detected state. According to an example embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, and/or an illuminance sensor.

The interface 177 may support one or more specified protocols to be used for the electronic device 101 to be coupled with the external electronic device (e.g., the electronic device 102) directly (e.g., wiredly) or wirelessly. According to an example embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). According to an example embodiment, the connecting terminal 178 may include, for example, an HDMI connector, a USB connector, an SD card connector, or an audio connector (e.g., a headphone connector).

The haptic module 179 may convert an electric signal into a mechanical stimulus (e.g., a vibration or a movement) or an electrical stimulus which may be recognized by a user via his or her tactile sensation or kinesthetic sensation. According to an example embodiment, the haptic module 179 may include, for example, a motor, a piezoelectric element, or an electric stimulator.

The camera module 180 may capture a still image and/or moving images. According to an example embodiment, the camera module 180 may include one or more lenses, image sensors, image signal processors, or flashes.

The power management module 188 may manage power supplied to the electronic device 101. According to an example embodiment, the power management module 188 may be implemented as, for example, at least a part of a power management integrated circuit (PMIC).

The battery 189 may supply power to at least one component of the electronic device 101. According to an example embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently of the processor 120 (e.g., an AP) and that support a direct (e.g., wired) communication or a wireless communication. According to an example embodiment, the communication module 190 may include a wireless communication module 192 (e.g., a cellular communication module, a short-range wireless communication module, and/or a global navigation satellite system (GNSS) communication module) and/or a wired communication module 194 (e.g., a local area network (LAN) communication module and/or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and a next-generation communication technology, e.g., a new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance in a high-frequency band, such as, e.g., beamforming, massive multiple-input and multiple-output (MIMO), full dimensional MIMO (FD-MIMO), an array antenna, analog beam-forming, or a large scale antenna. The wireless communication module 192 may support various requirements specified in the electronic device 101, an external electronic device (e.g., the electronic device 104), or a network system (e.g., the second network 199). According to an example embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an example embodiment, the antenna module 197 may include an antenna including a radiating element including a conductive material or a conductive pattern formed in or on a substrate (e.g., a printed circuit board (PCB)). According to an example embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or the power may be transmitted or received between the communication module 190 and the external electronic device via the at least one selected antenna. According to an example embodiment, another component (e.g., a radio frequency integrated circuit (RFIC)) other than the radiating element may be additionally formed as a part of the antenna module 197.

According to various example embodiments, the antenna module 197 may form a mmWave antenna module. According to an example embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be communicably coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an example embodiment, commands or data may be transmitted or received between the electronic device 101 and the external electronic device 104 via the server 108 coupled with the second network 199. Each of the external electronic devices 102 or 104 may be a device of the same type as or a different type from the electronic device 101. According to an example embodiment, all or some of operations to be executed by the electronic device 101 may be executed at one or more of the external electronic devices 102 and 104, and the server 108. For example, if the electronic device 101 needs to perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and may transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an example embodiment, the external electronic device 104 may include an Internet-of-things (IoT) device. The server 108 may be an intelligent server using machine learning and/or a neural network. According to an example embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various example embodiments may be one of various types of electronic devices. The electronic device may include, for example, a portable communication device (e.g., a smartphone), a computer device, a portable multimedia device, a portable medical device, a camera, a wearable device, or a home appliance device. According to an example embodiment of the disclosure, the electronic device is not limited to those described above.

It should be appreciated that various example embodiments of the present disclosure and the terms used therein are not intended to limit the technological features set forth herein to particular example embodiments and include various changes, equivalents, or replacements for a corresponding example embodiment. In connection with the description of the drawings, like reference numerals may be used for similar or related components. It is to be understood that a singular form of a noun corresponding to an item may include one or more of the things, unless the relevant context clearly indicates otherwise. As used herein, "A or B", "at least one of A and B", "at least one of A or B", "A, B or C", "at least one of A, B and C", and "A, B, or C," each of which may include any one of the items listed together in the corresponding one of the phrases, or all possible combinations thereof. Terms such as "first", "second", or "first" or "second" may simply be used to distinguish the component from other components in question, and may refer to components in other aspects (e.g., importance or order) is not limited. It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various example embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an example embodiment, the module may be implemented in a form of an application-specific integrated circuit (ASIC).

Various example embodiments as set forth herein may be implemented as software (e.g., the program 140) including one or more instructions that are stored in a storage medium (e.g., the internal memory 136 or the external memory 138) that is readable by a machine (e.g., the electronic device 101). For example, a processor (e.g., the processor 120) of the machine (e.g., the electronic device 101) may invoke at least one of the one or more instructions stored in the storage medium, and execute the one or more instructions. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Here, the term "non-transitory" means that the storage medium is a tangible device, and does not include a signal (e.g., an electromagnetic wave), but this term does not differentiate between where data is semi-permanently stored in the storage medium and where the data is temporarily stored in the storage medium.

According to an example embodiment, a method according to various example embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various example embodiments, each component (e.g., a module or a program) of the above-described components may include a single entity or multiple entities, and some of the multiple entities may be separately disposed in different components. According to various example embodiments, one or more of the above-described components may be omitted, or one or more other components may be added. Alternatively or additionally, a plurality of components (e.g., modules or programs) may be integrated into a single component. In such a case, according to various example embodiments, the integrated component may still perform one or more functions of each of the plurality of components in the same or similar manner as they are performed by a corresponding one of the plurality of components before the integration. According to various example embodiments, operations performed by the module, the program, or another component may be carried out sequentially, in parallel, repeatedly, or heuristically, or one or more of the operations may be executed in a different order or omitted, or one or more other operations may be added.

FIG. 2 is a block diagram illustrating a program according to various example embodiments. According to an example embodiment, a program 240 may include an OS 242 to control one or more resources of an electronic device (e.g., the electronic device 101 of FIG. 1), middleware 244, or an application 246 executable in the OS 242. The OS 242 may include, for example, Android™, iOS™, Windows™, Symbian™, Tizen™, or Bada™. At least part of the program 240, for example, may be pre-loaded on the electronic device 101 during manufacture, or may be downloaded from or updated by an external electronic device (e.g., the electronic device 102 or 104, or the server 108) during use by a user.

The OS 242 may control management (e.g., allocation or deallocation) of one or more system resources (e.g., a process, a memory, or a power source) of the electronic device 101. The OS 242 may additionally or alternatively include other one or more driver programs to drive other hardware devices of the electronic device 101, for example, the input module 150, the sound output module 155, the display module 160, the audio module 170, the sensor module 176, the interface 177, the haptic module 179, the camera module 180, the power management module 188, the battery 189, the communication module 190, the SIM 196, or the antenna module 197.

The middleware 244 may provide various functions to the application 246 such that a function or information provided from one or more resources of the electronic device 101 may be used by the application 246. The middleware 244 may include, for example, an application manager 201, a window manager 203, a multimedia manager 205, a resource manager 207, a power manager 209, a database manager 211, a package manager 213, a connectivity manager 215, a notification manager 217, a location manager 219, a graphic manager 221, a security manager 223, a telephony manager 225, or a voice recognition manager 227.

The application manager 201 may, for example, manage the life cycle of the application 246. The window manager 203, for example, may manage one or more graphical user interface (GUI) resources that are used on a screen. The multimedia manager 205, for example, may identify one or more formats to be used to play media files, and may encode or decode a corresponding one of the media files using a codec appropriate for a corresponding format selected from the one or more formats. The resource manager 207, for example, may manage the source code of the application 246 or a memory space of the memory 130. The power manager 209, for example, may manage the capacity, temperature, or power of the battery 189, and may determine or provide related information to be used for the operation of the electronic device 101 based on at least in part on corresponding information of the capacity, temperature, or power of the battery 189. According to an example embodiment, the power manager 209 may interwork with a basic input/output system (BIOS) of the electronic device 101.

The database manager 211, for example, may generate, search, or change a database to be used by the application 246. The package manager 213, for example, may manage installation or update of an application that is distributed in the form of a package file. The connectivity manager 215, for example, may manage a wireless connection or a direct connection between the electronic device 101 and the external electronic device. The notification manager 217, for example, may provide a function to notify a user of an occurrence of a specified event (e.g., an incoming call, a message, or an alert). The location manager 219, for example, may manage location information on the electronic device 101. The graphic manager 221, for example, may manage one or more graphic effects to be offered to a user or a user interface related to the one or more graphic effects.

The security manager 223, for example, may provide system security or user authentication. The telephony manager 225, for example, may manage a voice call function or a video call function provided by the electronic device 101. The voice recognition manager 227, for example, may transmit user's voice data to the server 108, and may receive, from the server 108, a command corresponding to a function to be executed on the electronic device 101 based on at least in part on the voice data, or text data converted based on at least in part on the voice data. According to an example embodiment, the middleware 244 may dynamically delete some existing components or add new components. According to an example embodiment, at least part of the middleware 244 may be included as a part of the OS 242 or implemented as another software separate from the OS 242.

The application 246 may include, for example, a home 251, dialer 253, short message service (SMS)/multimedia messaging service (MMS) 255, instant message (IM) 257, browser 259, camera 261, alarm 263, contact 265, voice recognition 267, email 269, calendar 271, media player 273, album 275, watch 277, health 279 (e.g., for measuring the degree of workout or biometric information, such as blood sugar), or environmental information 281 (e.g., for measuring air pressure, humidity, or temperature information) application. According to an example embodiment, the application 246 may further include an information exchanging application that is capable of supporting information exchange between the electronic device 101 and the external electronic device. The information exchange application, for example, may include a notification relay application adapted to transfer designated information (e.g., a call, message, or alert) to the external electronic device or a device management application adapted to manage the external electronic device. The notification relay application may transfer notification information corresponding to an occurrence of a specified event (e.g., receipt of an email) at another application (e.g., the email application 269) of the electronic device 101 to the external electronic device. Additionally or alternatively, the notification relay application may receive notification information from the external electronic device and provide the notification information to a user of the electronic device 101.

The device management application may control the power (e.g., turn-on or turn-off) or the function (e.g., adjustment of brightness, resolution, or focus) of an external electronic device that communicates with the electronic device 101 or a portion of components thereof (e.g., a display module or a camera module of the external electronic device). The device management application may additionally or alternatively support installation, delete, or update of an application running on the external electronic device.

In the following examples, operations may be performed sequentially, but not necessarily performed sequentially. For example, the order of the operations may be changed and at least two of the operations may be performed in parallel.

Figure 3:
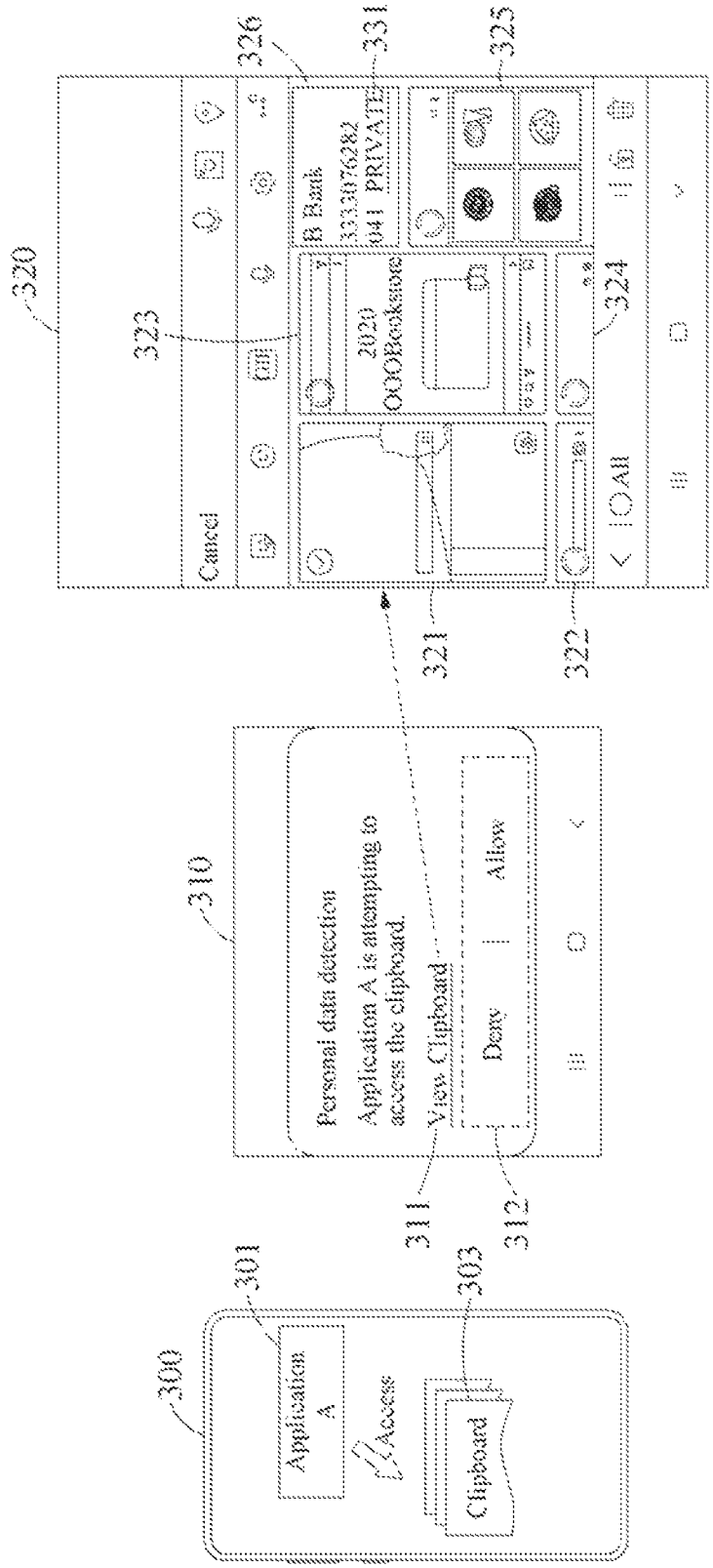
FIG. 3 illustrates an example in which an electronic device controls an access to a clipboard by an application, according to an example embodiment.

FIG. 3 illustrates an example in which an electronic device controls an access to a clipboard by an application, according to an example embodiment.

General data may be stored in a non-volatile memory (e.g., the non-volatile memory 134 of FIG. 1) or a volatile memory (e.g., the volatile memory 132 of FIG. 1), and may typically be accessed by a limited application (e.g., the application 246 of FIG. 2). A reuse rate of general data may be relatively high, and a scheme of displaying general data may be determined depending on an application.

Data stored in a clipboard may have attributes different from those of general data. The data stored in the clipboard may be stored in the volatile memory, and may be easily accessed by other applications. The data stored in the clipboard may be typically used one time and may be rarely reused. The data stored in the clipboard may be visually identified through a display (e.g., the display module 160 of FIG. 1).

Due to the attributes of the data stored in the clipboard, existing data including personal information stored in the clipboard may be accessed without permission via another application in the same electronic device (e.g., an electronic device 300). The other application may access the clipboard to collect existing data or replace the existing data with new input data that includes personal information. Such an attack may be referred to as "clipboard hijacking".

According to an example embodiment, the electronic device 300 (e.g., the electronic device 101 of FIG. 1) may safely manage data including personal information stored in the clipboard. The electronic device 300 may detect a read access or write access to the clipboard and determine whether personal information is included in the data stored in the clipboard. The electronic device 300 may notify a user of an external access to personal information so that the user may determine whether to allow the external access. The electronic device 300 may provide the user with various options that are associated with whether to allow an access to protect personal information.

According to an example embodiment, the electronic device 300 may provide a data deletion function to a user. When an access to the clipboard is detected, the electronic device 300 may ask the user whether to delete data of the clipboard. For example, the electronic device 300 may disallow an access to data including personal information of the clipboard and delete corresponding data. As another example, the electronic device 300 may allow an access to data including personal information of the clipboard and ask the user whether to delete corresponding data.

According to an example embodiment, the electronic device 300 may provide an automatic deletion function, instead of asking the user whether to delete corresponding data, every time data of the clipboard is accessed without permission. The electronic device 300 may pre-set whether to automatically delete data based on a user input, in response to the clipboard being accessed without permission. If the clipboard is actually accessed without permission, the electronic device 300 may automatically delete data based on a period and a range that are preset by a user. The electronic device 300 may delete data before an access is allowed, and may move the data to a safe storage space.

The electronic device 300 may provide various options for a storage space to be used when data including personal information is stored in the clipboard or after data including personal information is deleted. The electronic device 300 may provide a user with a storage space that is safely protected in various ways. The electronic device 300 may encrypt a portion or all of data and store the encrypted data in a safely protected storage space.

According to an example embodiment, the electronic device 300 may include a storage area of the clipboard, a storage area of personal information format data, and a safe storage area. The storage area of the clipboard may be included in a volatile memory (e.g., the volatile memory 132 of FIG. 1). The storage area of the personal information format data may be included in a non-volatile memory (e.g., the non-volatile memory 134 of FIG. 1). The safe storage area may be, for example, a storage area that is not accessible via the clipboard, and may be included in a volatile memory or a non-volatile memory. Various schemes of securely storing data may be applied to the safe storage area. For example, the safe storage area may be accessed only when authentication is completed through an authentication module.

Hereinafter, the storage area of the clipboard may be referred to as a "first storage area." Data scanning may be performed on the first storage area, by a sensing module. A second storage area may be an area on which data scanning by the sensing module is not performed, and may be included in a non-volatile memory. The safe storage area (or a safe storage) may be referred to as a "third storage area."

According to an example embodiment, the first storage area, the second storage area, and the third storage area may be data storage areas based on the execution of an application classified according to security levels. Accessibility of each of the first storage area through the third storage area may be determined according to the security levels. The first storage area may have a security level less than those of the second storage area and the third storage area, and may be relatively easily accessed. A security level of the second storage area may be greater than that of the first storage area and less than that of the third storage area. The second storage area may be included in the form of hardware or software in an electronic device. The third storage area may have a highest security level among the aforementioned areas and may be included in the form of separate hardware separated from the first storage area and the second storage area in the electronic device. For example, the first storage area and the second storage area may be located on a processor, and the third storage area may be located on a security circuit that is hardware independent of the processor.

An access may include, for example, a read access and a write access. The read access may be an access to read existing data that is pre-stored in a clipboard. The read access may include an operation of viewing or duplicating existing data of a clipboard. For example, the operation may include pasting the existing data in the clipboard to another location, or retrieving existing data stored in the clipboard through an application or browser.

The write access may be an access to store input data in the clipboard. The write access may include an operation of newly storing input data in a clipboard or replacing existing data stored in a clipboard with input data. For example, the write recess may include all operations of writing input data in a clipboard or modifying existing data with new input data, in, for example, a case in which a photograph or image in a clipboard is copied by a browser, a case in which text is copied by long pressing text while inputting text, or a case in which data of a clipboard is modified by a non-permitted access.

According to an example embodiment, the electronic device 300 may protect personal information included in a clipboard stored in the first storage area from a read access to the clipboard by an unauthorized application. The electronic device 300 may detect a read access to a clipboard by an application. The electronic device 300 may scan all existing data included in the clipboard of the first storage area. The electronic device 300 may determine whether personal information is included in the existing data in the clipboard that an application attempts to access.

According to an example embodiment, to determine whether personal information is present, the electronic device 300 may use its own decision logic, a regular expression, a natural language analysis, or personal information format data. If it is determined that the personal information is present, the electronic device 300 may indicate that the personal information is present in corresponding data, using metadata or a flag.

According to an example embodiment, the electronic device 300 may move existing data of the clipboard on which data scanning is performed from the first storage area to the second storage area. Since the data scanning is performed on the first storage area only, data scanning may not be performed again on the existing data moved to the second storage area. According to an example embodiment, the electronic device 300 may assign a flag to the existing data of the clipboard on which the data scanning is performed to indicate a state in which the data scanning is performed, thereby reducing redundancy of data scanning. Thus, the electronic device 300 may efficiently use resources by preventing redundancy of data scanning.

According to an example embodiment, if it is determined that personal information is included in existing data, the electronic device 300 may provide various options to control an access by an application. The electronic device 300 may display a user interface (e.g., a pop-up window) including various options. For example, the pop-up window may include an option to deny an access by an application, an option to allow an access by an application, or an option to display content of a clipboard.

According to an example embodiment, if an option to display content of a clipboard is selected in response to a user input, all existing data included in the clipboard may be displayed. Data including personal information among the existing data may be marked to indicate that the personal information is included. Accordingly, a user may identify existing data that an application attempts to read and may determine whether to allow an access.

According to an example embodiment, the electronic device 300 may protect the clipboard from a write access to the clipboard by an unauthorized application. The electronic device 300 may detect a write access to the clipboard by an application.

According to an example embodiment, the electronic device 300 may determine a focus state of the application, in response to the write access being detected. The electronic device 300 may determine whether the application is in a foreground state or a background state. If the application is in the background state, the electronic device 300 may determine whether to allow an access by the application, based on a user input. Since an attack by the application in the background state occurs more frequently than an attack by the application in the foreground state, resources may be saved without a need for data scanning by disallowing all accesses by the application in the background state.

According to an example embodiment, if an access by an application is allowed when the application is in the foreground state or even in the background state, the electronic device 300 may scan input data that the application attempts to input to the clipboard. The electronic device 300 may determine whether personal information is included in input data that the application attempts to write.

According to an example embodiment, to determine whether personal information is present, the electronic device 300 may use its own decision logic, a regular expression, a natural language analysis, or personal information format data. If it is determined that the personal information is present, the electronic device 300 may mark a presence of the personal information in input data using metadata or a flag.

According to an example embodiment, if it is determined that personal information is included in input data, the electronic device 300 may provide various options to control an access by an application. The electronic device 300 may display input data, and a user interface (e.g., a pop-up window) including various options. Through the user interface, a user may determine content of data that is attempted to be accessed, and may allow or deny a corresponding write operation. For example, the pop-up window may include an option to deny an input of an application, an option to allow an input of an application and securely store input data or existing data to be overwritten with the input data, or an option to allow an access by an application and store input data or existing data to be overwritten with the input data in a clipboard.

FIG. 3 illustrates an example in which an application attempts a read access to a clipboard. The electronic device 300 may allocate a storage area of a clipboard 303 to a non-volatile memory. The electronic device 300 may currently execute an application A 301, and the application A 301 may be in a background state.

According to an example embodiment, the application A 301 may access the clipboard 303 without permission. The electronic device 300 may detect an access by the application A 301. The electronic device 300 may determine the access by the application A 301 as a read access.

According to an example embodiment, the electronic device 300 may perform scanning to determine whether personal information is included in existing data stored in a clipboard. The electronic device 300 may determine whether the personal information is included in the existing data, based on pre-stored personal information format data. The electronic device 300 may assign a marking indicating that the personal information is included to the existing data.

For example, a screen 320 may display existing data stored in a clipboard. In this example, existing data 326 may include personal information "B bank 3333076282041". The electronic device 300 may determine that the existing data 326 includes personal information, based on personal information format data associated with a bank account number. The electronic device 300 may generate or record metadata or a flag indicating that the personal information is included in the existing data 326, to indicate that the personal information is present.

According to an example embodiment, in response to a result indicating that the personal information is included in the existing data 326, the electronic device 300 may display a user interface (e.g., a pop-up window) including various options. For example, a pop-up window may be displayed on a screen 310. The pop-up window may indicate that personal data has been detected and that the application A attempts to access a clipboard. The electronic device 300 may request a user to select various options through a user interface (e.g., a pop-up window). For example, the pop-up window may include an option 311 to view a clipboard and an option 312 to deny or allow an access.

According to an example embodiment, if the option 311 to view the clipboard is selected in response to a user input, the electronic device 300 may display all existing data 321, 322, 323, 324, 325 and 326 included in the clipboard. A marking 331 indicating that personal information is included may be displayed on the existing data 326 including the personal information. Accordingly, a user may identify existing data that an application attempts to read, and may determine whether to allow a read access by the application A 301.

If all accesses to the clipboard are restricted, it may be difficult to protect personal information after an access is allowed. However, the electronic device 300 may selectively restrict an access to the clipboard based on a user's determination, and thus it is possible to more fully protect personal information.

The electronic device 300 may perform encryption according to a user's selection, to reduce an amount of time or resources used for encryption or decryption in comparison to a scheme of encrypting data at all times when data is input and/or output. The scheme of encrypting data at all times may have a difficulty in identifying the encrypted data. However, the electronic device 300 may display data stored in a clipboard to a user and perform encryption, thereby increasing a user convenience.

Figure 4:
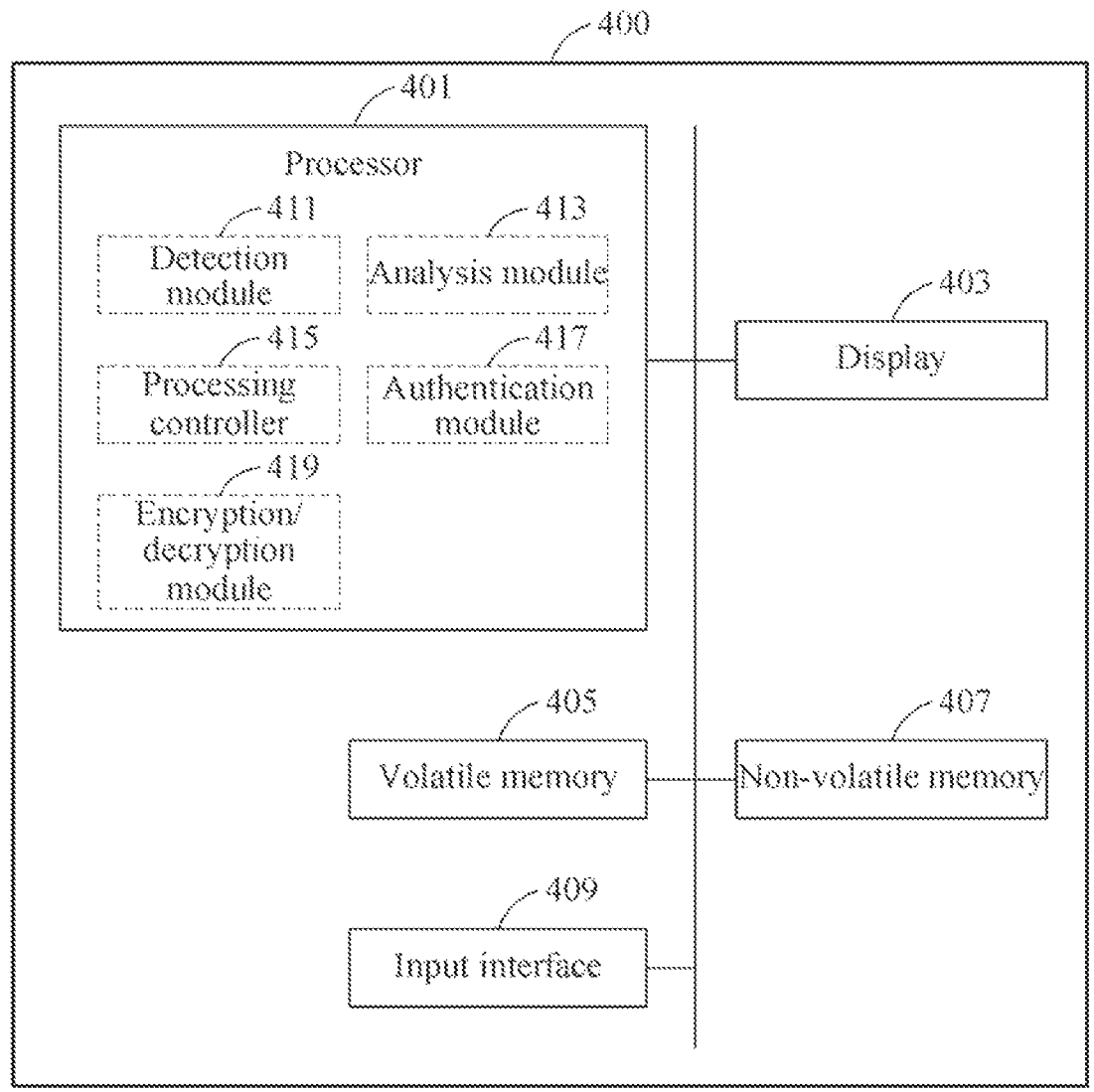
FIG. 4 illustrates a configuration of an electronic device according to an example embodiment.

FIG. 4 illustrates a configuration of an electronic device according to an example embodiment.

According to an example embodiment, an electronic device 400 (e.g., the electronic device 101 of FIG. 1) may include at least one processor 401 (e.g., the processor 120 of FIG. 1), a display 403 (e.g., the display module 160 of FIG. 1), a volatile memory 405 (e.g., the volatile memory 132 of FIG. 1), a non-volatile memory 407 (e.g., the non-volatile memory 134 of FIG. 1), and/or an input interface 409 (e.g., the input module 150 of FIG. 1). The volatile memory 405 may include a first storage area configured to store a clipboard including one or more pieces of existing data. The processor 401 may include an OS (e.g., the OS 242 of FIG.

2), middleware (e.g., the middleware 244 of FIG. 2), and an application (e.g., the application 246 of FIG. 2) executable in the OS.

According to an example embodiment, the electronic device 400 may protect personal information included in a clipboard stored in the first storage area from a read access to the clipboard by an unauthorized application.

According to an example embodiment, the processor 401 may detect a read access to existing data included in the clipboard by an application. The processor 401 may perform data scanning on the clipboard of the first storage area.

According to an example embodiment, the volatile memory 405 may include a second storage area on which data scanning is not performed. The processor 401 may move one or more pieces of existing data that are scanned to the second storage area on which the data scanning is not performed. The electronic device 400 may efficiently use resources by preventing redundancy of data scanning.

According to an example embodiment, the processor 401 may determine whether the existing data includes personal information through data scanning of the clipboard. The processor 401 may determine whether personal information is included in existing data in a clipboard that an application attempts to access.

According to an example embodiment, the processor 401 may determine whether the existing data includes the personal information, based on personal information format data stored in the non-volatile memory 407. However, this is merely an example, and the processor 401 may use its own decision logic, or a scheme such as a regular expression or a natural language analysis.

According to an example embodiment, when the existing data includes the personal information, the processor 401 may store metadata indicating that the existing data includes the personal information in the non-volatile memory 407. The processor 401 may record, using a flag, whether the existing data includes the personal information.

According to an example embodiment, when the existing data includes the personal information, the processor 401 may display the existing data included in the clipboard on the display 403 using a window manager included in the middleware. The processor 401 may determine whether to allow the read access to the existing data by the application, based on a user input provided through the input interface 409.

According to an example embodiment, in response to data including personal information being stored in the clipboard or in response to a determination to disallow the read access by the application, the processor 401 may delete the existing data from the clipboard and store the existing data in a third storage area that is not accessible via the clipboard.

According to an example embodiment, in response to a determination to allow the read access by the application, the processor 401 may allow the read access by the application to the existing data once or always, based on a user input provided through the input interface 409. The processor 401 may delete the existing data from the clipboard and store the existing data in a third storage area that is not accessible via the clipboard.

According to an example embodiment, in response to a determination to allow the read access by the application, the processor 401 may allow the read access by the application to the existing data, based on a user input provided through the input interface 409. The processor 401 may delete the existing data from the clipboard, encrypt the existing data, and store the encrypted existing data in a third storage area that is not accessible via the clipboard.

According to an example embodiment, the electronic device 300 may protect the clipboard from a write access to the clipboard by an unauthorized application.

According to an example embodiment, the processor 401 may detect a write access of input data to a clipboard by an application. The processor 401 may perform data scanning on input data that an application attempts to write on the clipboard. The processor 401 may determine whether the input data includes personal information through the data scanning of the input data. The processor 401 may determine whether the personal information is included in the input data that the application attempts to write on the clipboard.

According to an example embodiment, the processor 401 may determine whether the input data includes the personal information, based on the personal information format data stored in the non-volatile memory 407. However, this is merely an example, and the processor 401 may use its own decision logic, or a scheme such as a regular expression or a natural language analysis.

According to an example embodiment, when the input data includes the personal information, the processor 401 may store metadata indicating that the input data includes the personal information in the non-volatile memory 407. The processor 401 may record, using a flag, whether the existing data includes the personal information.

According to an example embodiment, when the input data includes the personal information, the processor 401 may determine whether to allow the write access by the application based on a user input provided through the input interface 409. The processor 401 may display the input data on the display 403, using a window manager included in the middleware. Accordingly, a user may view the input data and provide a user input indicating whether to allow the write access.

According to an example embodiment, when an application is being executed in the background, the processor 401 may determine whether to allow a write access to the clipboard by the application once, whether to allow the write access always, or whether to disallow the write access, based on a user input provided through the input interface 409. Since an attack by the application in the background state occurs more frequently than an attack by the application in the foreground state, resources may be saved without a need for data scanning by disallowing all accesses by the application in the background state.

According to an example embodiment, in response to a determination to allow the write access by the application, the processor 401 may store metadata indicating that the input data is disposable data and store existing data in a third storage area that is not accessible via the clipboard, based on a user input provided through the input interface 409. In response to the determination to allow the write access by the application, the processor 401 may store existing data in a third storage area that is not accessible via the clipboard, based on a user input provided through the input interface 409. In response to the determination to allow the write access by the application, the processor 401 may store the input data in the clipboard, based on a user input provided through the input interface 409.

According to an example embodiment, the processor 401 may include a detection module 411, an analysis module 413, a processing controller 415, an authentication module 417, and an encryption/decryption module 419. The detection module 411, the analysis module 413, the processing controller 415, the authentication module 417, and the encryption/decryption module 419 may be functionally divided, and may be implemented in hardware and software, or a combination thereof. If the detection module 411, the analysis module 413, the processing controller 415, the authentication module 417, and the encryption/decryption module 419 are implemented in software, functions of the detection module 411, the analysis module 413, the processing controller 415, the authentication module 417, and the encryption/decryption module 419 may be performed by the processor 401 (e.g., the processor 120 of FIG. 1).

According to an example embodiment, the detection module 411 may detect an access to a clipboard. The detection module 411 may detect an access to the clipboard through an application (e.g., the application 246 of FIG. 2), a browser, or the input interface 409 (e.g., the input module 150 of FIG. 1). The detection module 411 may detect an access to the clipboard by an application that is not in a foreground state or an application that is in a background state.

According to an example embodiment, if an access is detected, the analysis module 413 may analyze whether personal information is present in existing data of a clipboard to be accessed or in input data to be input to the clipboard. Here, the existing data may be data that is already stored in the clipboard, and the input data may be data that an application attempts to input to the clipboard. The analysis module 413 may determine personal information using a scheme such as a regular expression representing personal information or a natural language analysis (e.g., natural language processing (NLP)), or using personal information format data. However, a scheme of determining personal information is not limited thereto.

The personal information format data may be data associated with a format in which personal information is represented or stored. For example, the personal information format data may have a format such as an expression format of "*bank [0-9]+–[0-9]+–[0-9]+" or an expression format of personal information expressed on an identification card. However, this is merely an example, and various expression formats of personal information may be included in the personal information format data.

According to an example embodiment, if it is determined that personal information is present in data, the analysis module 413 may generate metadata indicating that the data includes the personal information and store the metadata in a memory. For example, the analysis module 413 may record, in the metadata, an indication that the personal information is included, or may use a flag to indicate whether the personal information is included. A field added to a clipboard data format may be assigned to display the flag.

According to an example embodiment, the processing controller 415 may function to perform the overall operation. The processing controller 415 may display a related pop-up window according to a presence or absence of personal information, control an access right, or delete data according to a user's input. The processing controller 415 may store data in a safe storage (e.g., a third storage area) according to a storage option designated by a user, or may send the data to the encryption/decryption module 419 to encrypt or decrypt the data.

According to an example embodiment, the authentication module 417 may authenticate a user, using various authentication schemes, when the user enters a setting menu and determines data in a safe storage. The authentication schemes may include, but are not limited to, for example, various biometric authentication, pattern authentication, authentication with a certificate, or authentication using a password.

According to an example embodiment, the encryption/decryption module 419 may encrypt or decrypt data received from the processing controller 415. The encryption/decryption module 419 may use various encryption schemes and/or decryption schemes.

Hereinafter, a method of operating an electronic device (e.g., the electronic device 101 of FIG. 1 or the electronic device 400 of FIG. 4) according to various example embodiments will be described in detail with reference to FIGS. 5, 6, and 10. According to various example embodiments, operations performed by the electronic device 400 that will be described below may be performed by a processor (e.g., the processor 120 of FIG. 1, or the processor 401 of FIG. 4) including at least one processing circuitry of the electronic device 400. According to an example embodiment, the operations performed by the electronic device 400 may be performed by instructions that are stored in the memory 130 of FIG. 1 and that are executed to cause the processor 401 to operate.

According to an example embodiment, the electronic device 400 (e.g., the electronic device 101 of FIG. 1) may include at least one processor 401 (e.g., the processor 120 of FIG. 1), a display 403 (e.g., the display module 160 of FIG. 1), a volatile memory 405 (e.g., the volatile memory 132 of FIG. 1) including a first storage area configured to store a clipboard including one or more pieces of existing data, a non-volatile memory 407 (e.g., the non-volatile memory 134 of FIG. 1), and an input interface 409 (e.g., the input module 150 of FIG. 1). The processor 401 may execute an OS (e.g., the OS 242 of FIG. 2), middleware (e.g., the middleware 244 of FIG. 2) and an application (e.g., the application 246 of FIG. 2) executable in the OS, may detect a read access to existing data included in the clipboard by the application, may determine whether the existing data includes personal information through data scanning of the clipboard, and may determine whether to allow the read access to the existing data by the application based on a user input provided through the input interface 409 when the existing data includes the personal information.

The processor 401 may determine whether the existing data includes the personal information based on personal information format data stored in the non-volatile memory 407.

When the existing data includes the personal information, the processor 401 may store metadata indicating that the existing data includes the personal information.

The volatile memory 405 may include a second storage area on which the data scanning is not performed, and the processor 401 may move the one or more pieces of existing data on which the data scanning is performed to the second storage area on which the data scanning is not performed.

When the existing data includes the personal information, the processor 401 may display the existing data included in the clipboard on the display 403 using a window manager included in the middleware, and may determine whether to allow the read access to the existing data by the application based on a user input provided through the input interface 409.

In response to a determination to disallow the read access by the application, the processor 401 may delete the existing data from the clipboard and store the existing data in a third storage area that is not accessible via the clipboard.

In response to a determination to allow the read access by the application, the processor 401 may allow the read access to the existing data by the application once or always, may delete the existing data from the clipboard, and may store the existing data in a third storage area that is not accessible via the clipboard, based on a user input provided through the input unit 409.

In response to a determination to allow the read access by the application, the processor 401 may allow the read access to the existing data by the application, may delete the existing data from the clipboard, may encrypt the existing data, and may store the encrypted existing data in a third storage area that is not accessible via the clipboard, based on a user input provided through the input interface 409.

According to an example embodiment, the processor 401 may execute an OS, middleware, and an application executable in the OS, detect a write access of input data to the clipboard by the application, determine whether the input data includes personal information through data scanning of the input data, and determine whether to allow the write access by the application based on a user input provided through the input unit 409, when the input data includes the personal information.

The processor 401 may determine whether the input data includes the personal information based on the personal information format data stored in the non-volatile memory 407.

When the input data includes the personal information, the processor 401 may store metadata indicating that the input data includes the personal information.

When the application is being executed in a background, the processor 401 may determine whether to allow the write access to the clipboard by the application once, whether to allow the write access always, or whether to disallow the write access, based on a user input provided through the input interface 409.

In response to a determination to allow the write access by the application, the processor 401 may store metadata indicating that the input data is disposable data, and store existing data in a third storage area that is not accessible via the clipboard, based on a user input provided through the input interface 409.

In response to the determination to allow the write access by the application, the processor 401 may store the input data in the clipboard.

Figure 5:
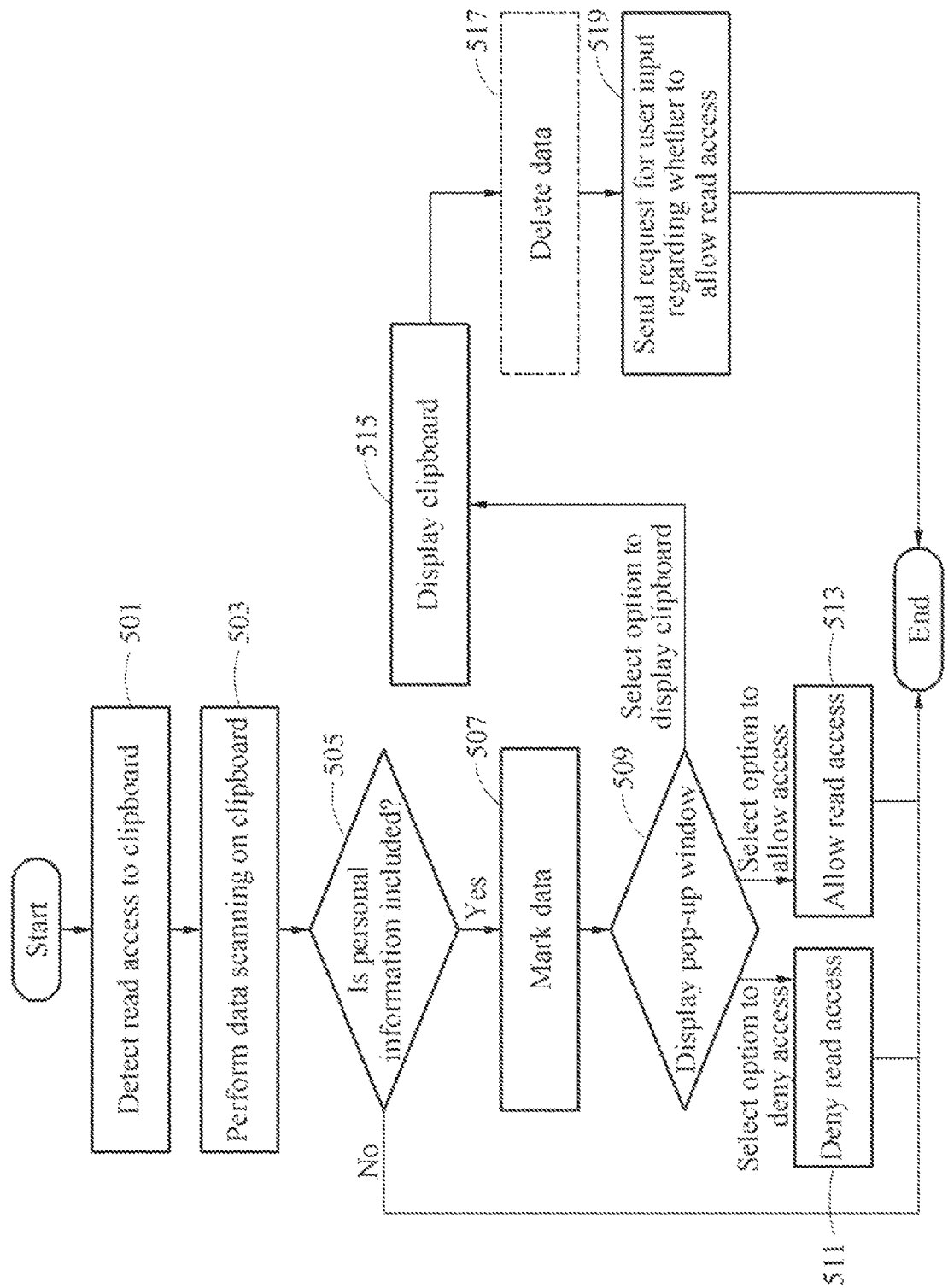
FIG. 5 is a flowchart illustrating an example in which an electronic device determines whether to allow a read access to a clipboard by an application, according to an example embodiment.

FIG. 5 is a flowchart illustrating an example in which an electronic device determines whether to allow a read access to a clipboard by an application, according to an example embodiment.

According to an example embodiment, in operation 501, the electronic device (e.g., the electronic device 400 of FIG. 4) may detect a read access to a clipboard. The electronic device 400 may detect a read access to the clipboard by an unauthorized application (e.g., the application 246 of FIG. 2).

According to an example embodiment, in operation 503, the electronic device 400 may perform data scanning on the clipboard. According to an example embodiment, in operation 505, the electronic device 400 may determine whether data including personal information is included in existing data stored in the clipboard. If there is no data including personal information, the electronic device 400 may allow the read access by the application and end a procedure.

According to an example embodiment, if the data including the personal information is present, the electronic device 400 may mark the existing data including the personal information as an indication that the personal information is included in operation 507. The electronic device 400 may generate or record metadata or a flag indicating that the personal information is included in the existing data.

According to an example embodiment, in operation 509, the electronic device 400 may display a pop-up window to provide various options for the read access, using a display (e.g., the display 403 of FIG. 4). For example, the pop-up window may include an option to deny an access by an application, an option to allow an access by an application, or an option to display content of a clipboard.

According to an example embodiment, if a user input to select an option to deny an access by an application is input through an input interface (e.g., the input interface 409 of FIG. 4), the electronic device 400 may deny the read access by the application in operation 511. If a user input to select an option to allow an access by an application is input through the input interface 409, the electronic device 400 may allow the read access by the application in operation 513.

According to an example embodiment, if a user input to select an option to display content of a clipboard is input through the input interface 409, the electronic device 400 may display the content of the clipboard using the display 403 in operation 515. The electronic device 400 may display all existing data stored in the clipboard. Existing data including personal information among all the existing data may be marked to indicate that the personal information is included.

A user may determine the displayed content of the clipboard and determine whether to allow the read access by the application. According to an example embodiment, in operation 517, the electronic device 400 may send, to a user, a request for a user input regarding whether to delete the existing data including the personal information. The electronic device 400 may delete or maintain data according to a user input. In operation 519, the electronic device 400 may send a request for a user input regarding whether to allow the read access by the application.

Figure 6:
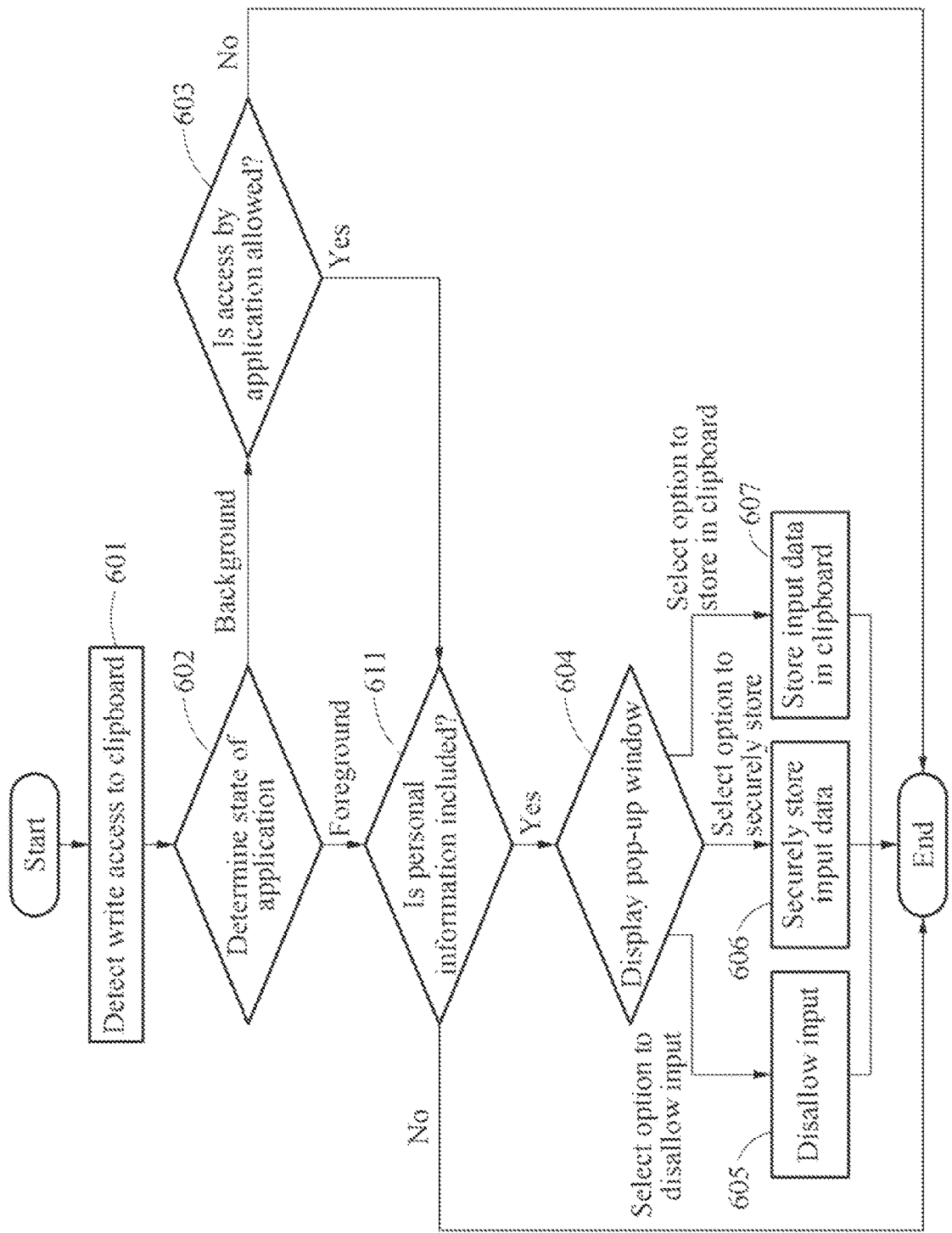
FIG. 6 is a flowchart illustrating an example in which an electronic device determines whether to allow a write access to a clipboard by an application, according to an example embodiment.

FIG. 6 is a flowchart illustrating an example in which an electronic device determines whether to allow a write access to a clipboard by an application, according to an example embodiment.

According to an example embodiment, in operation 601, the electronic device (e.g., the electronic device 400 of FIG. 4) may detect a write access to a clipboard. The electronic device 400 may detect a write access to the clipboard by an unauthorized application (e.g., the application 246 of FIG. 2).

According to an example embodiment, in operation 602, the electronic device 400 may determine a state of the application. The electronic device 400 may determine whether the application is in a background state or a foreground state.

According to an example embodiment, when the application is in the background state, the electronic device 400 may determine whether to allow an access by the application in operation 603. The electronic device 400 may determine whether to allow the access by the application based on a user input. In response to a user input to disallow the access by the application, the electronic device 400 may restrict the access by the application and end a procedure.

According to an example embodiment, when the application is in the foreground state or in response to a user input to allow an access by the application, the electronic device 400 may determine whether personal information is included in input data in operation 611. When the input data does not include the personal information, the electronic device 400 may allow the write access by the application and end the procedure.

According to an example embodiment, when the input data does not include the personal information, the electronic device 400 may display a pop-up window to provide various options for the write access on a display (e.g., the display 403 of FIG. 4) in operation 604. For example, the pop-up window may include an option to disallow an input of input data (disallow write access), an option to securely store input data, or an option to store input data in a clipboard.

According to an example embodiment, when a user input to select an option to disallow an input of input data is input through an input interface (e.g., the input interface 409 of FIG. 4), the electronic device 400 may restrict the write access by the application by disallowing the write access in operation 605.

According to an example embodiment, when a user input to select an option to securely store input data is input through the input interface 409, the electronic device 400 may securely store the input data in a third storage area in operation 606. When a user input to select an option to store input data in a clipboard is input through the input interface 409, the electronic device 400 may store the input data in the first storage area to store the input data in the clipboard in operation 607.

Figure 7:
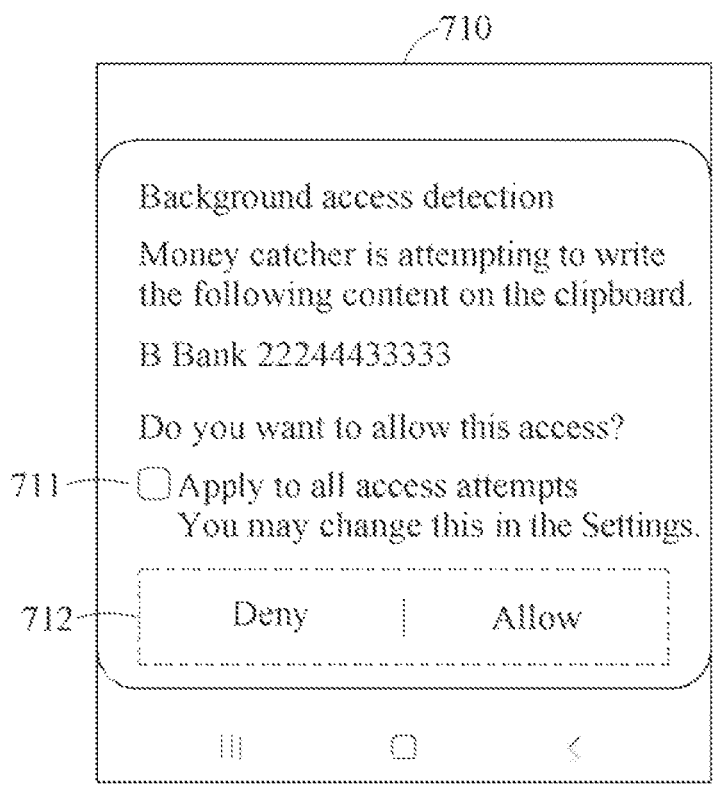
FIG. 7 illustrates an example of a pop-up window of an electronic device asking whether to allow a write access by an application to a clipboard in response to the write access according to an example embodiment.

FIG. 7 illustrates an example of a pop-up window of an electronic device asking whether to allow a write access by an application to a clipboard in response to the write access according to an example embodiment.

According to an example embodiment, the electronic device (e.g., the electronic device 400 of FIG. 4) may determine whether an application (e.g., the application 246 of FIG. 2) is in a background state or a foreground state. If the application is in the background state, the electronic device 400 may determine whether to allow an access by the application 246. Since an attack of the application 246 in the background state occurs more frequently than that in the foreground state, resources may be saved without a need for data scanning by disallowing all accesses by the application 246 in the background state.

FIG. 7 illustrates a pop-up window 710 that is displayed when the application 246 is in the background state. The pop-up window 710 may display a name (e.g., a money catcher) of the application 246 that attempts to access a clipboard, and input data (e.g., B bank 22244433333) attempted to be input. The pop-up window 710 may include various options associated with an access by the application 246.

For example, the pop-up window 710 may include an option 712 to determine whether to allow the access by the application 246. Here, whether to allow the access by the application 246 may be determined before data scanning. If the access is allowed, data scanning may be performed and then whether to allow the access may be determined again based on whether personal information is included.

For example, the pop-up window 710 may include an option 711 to determine whether to apply a selection of the option 712 to all accesses. If a checkbox indicating "Apply to all access attempts" is checked, a single selection of the option 712 to determine whether to allow an access may equally be applied to all subsequent accesses. If the checkbox is not checked, a selection of the option 712 to determine whether to allow an access may be requested each time an access occurs. A setting for the option 711 may be changed in a setting menu.

Figure 8:
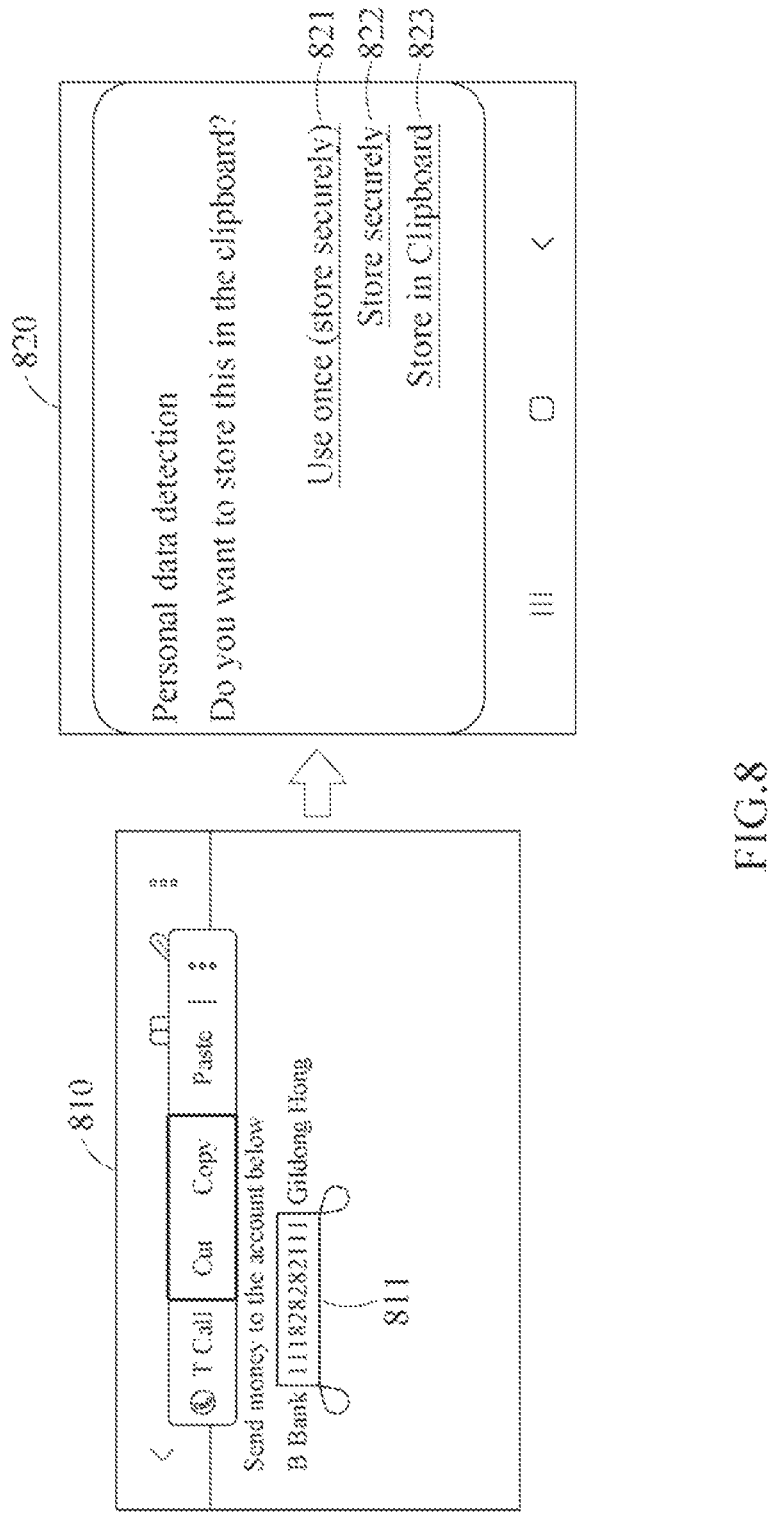
FIG. 8 illustrates an example of a pop-up window of an electronic device asking an option to store data when an access to a clipboard by an application is allowed, according to an example embodiment.

FIG. 8 illustrates an example of a pop-up window of an electronic device asking an option to store data when an access to a clipboard by an application is allowed, according to an example embodiment.

FIG. 8 illustrates screens 810 and 820. The screen 810 may display a situation in which personal information 811 is stored in a clipboard through a "cut" or "copy" function according to a user's selection. The screen 820 may display a pop-up window including various options that may be provided to a user when the personal information 811 is detected through data scanning. For example, the pop-up window may include an option 821 to "use once (store securely)", an option 822 to "store securely", and an option 823 to "store in clipboard".

According to an example embodiment, the option 821 may provide a function of storing data in a third storage area and deleting the data from the third storage area if the data is used once. The electronic device (e.g., the electronic device 400 of FIG. 4) may mark data with a flag indicating that the data is disposable and store the data in the third storage area. For example, Windows™ may provide a function that may add a customized format to a clipboard, so that a user may set a desired flag. Through such a clipboard customized field setting, whether data is disposable data may be displayed.

According to an example embodiment, the option 822 may provide a function of semi-permanently storing data in the third storage area.

According to an example embodiment, the option 823 may provide a function of storing data in a clipboard (or a first storage area).

Figure 9:
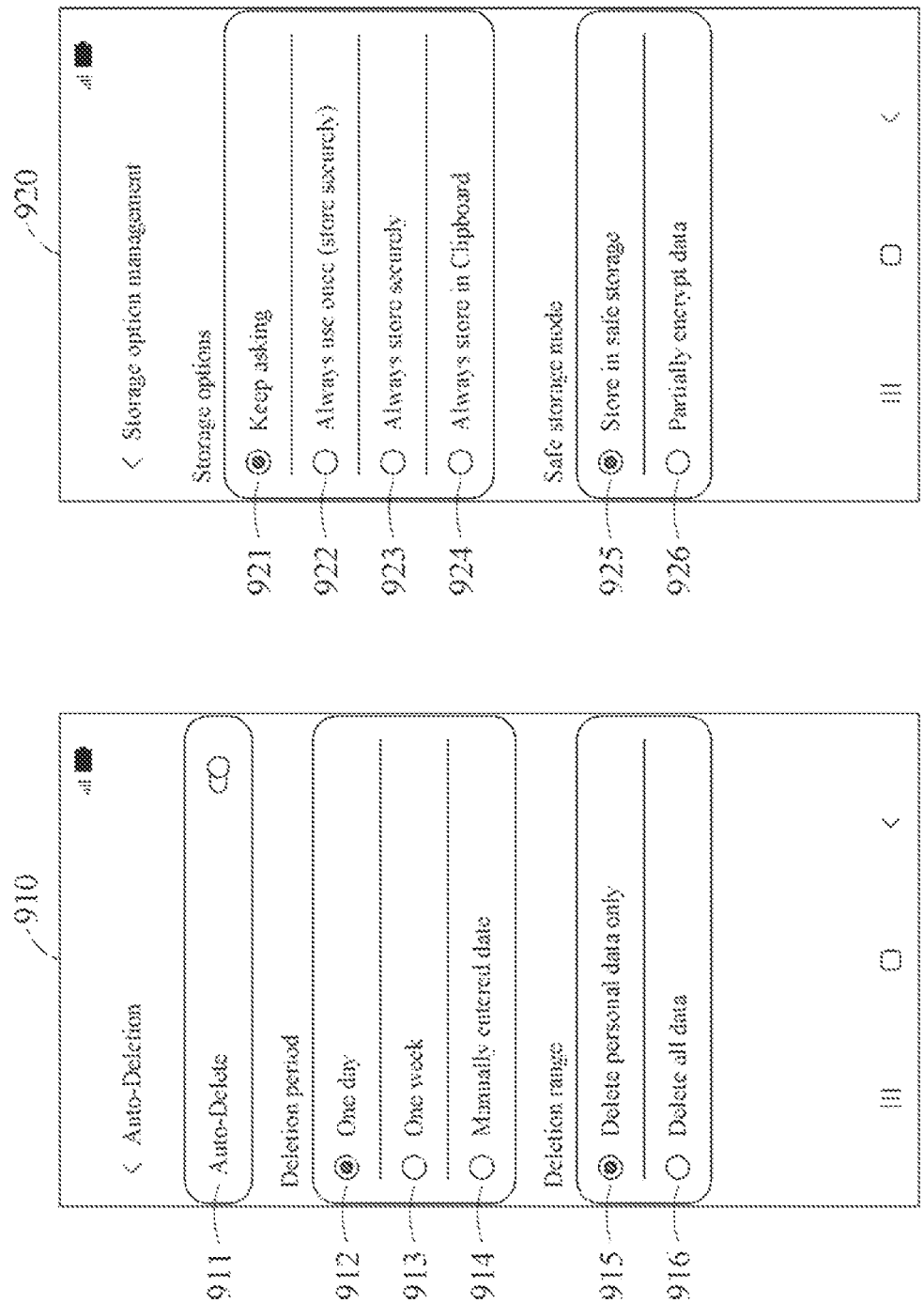
FIG. 9 illustrates an example of a setting menu of each of an automatic deletion option or a storage option provided by an electronic device according to an example embodiment.

FIG. 9 illustrates an example of a setting menu of each of an automatic deletion option or a storage option provided by an electronic device according to an example embodiment.

FIG. 9 illustrates menus 910 and 920. A user may enter the setting menu and select the menus 910 and 920 to control a clipboard.

According to an example embodiment, the menu 910 may provide an automatic deletion function. An automatic deletion option 911 may provide a function of automatically deleting personal information stored in a clipboard and/or a third storage area.

According to an example embodiment, if the automatic deletion option 911 is activated, a deletion period may be selected. In a deletion period list, an option 912 of "one day" may provide a function of deleting data of a clipboard on a daily basis. An option 913 of "one week" may provide a function of deleting data of a clipboard on a weekly basis. An option 914 of a "manually entered date" may provide a function of deleting data of a clipboard at an interval set by a user.

According to an example embodiment, if the automatic deletion option 911 is activated, a deletion range may be selected. In a deletion range list, an option 915 to "delete personal data only" may provide a function of deleting only data including personal information among data of a clipboard, and an option 916 to "delete all data" may provide a function of deleting all data of a clipboard.

According to an example embodiment, the menu 920 may provide various storage options. A storage option list may provide a function of selecting whether to securely store data. An option 921 to "keep asking" may provide a user with a function of selecting a storage option every time an access to a clipboard occurs. An option 922 to "always use once (store securely)" may provide a function of storing data in a third storage area on the premise that data is deleted always if the data is used once according to a single selection. An option 923 to "always store securely" may provide a function of always storing data in the third storage area according to a single selection. An option 924 to "always store in clipboard" may provide a function of always storing data in a clipboard according to a single selection.

According to an example embodiment, a safe storage mode list may provide a function of selecting various modes for securely storing data if the option 922 or 923 is selected. An option 925 to "store in safe storage" may provide a function of storing data in a third storage area. An option 926 to "partially encrypt data" may provide a function of partially encrypting data. Data may be partially encrypted so that a user may identify the data. For example, the electronic device (e.g., the electronic device 400 of FIG. 4) may encrypt personal information such as "Money Bank 22234444234" to "##Bank #######234" or "#F Bank #AJFIF2fj3234". Data such as photographs may be encrypted in the same way as described above. In an example of text data, a masking scheme or an encryption scheme using a key may be used. In an example of photographs or image data, a masking scheme may be used. However, these are merely examples, and various encryption schemes may be applied without limitation.

Figure 10:
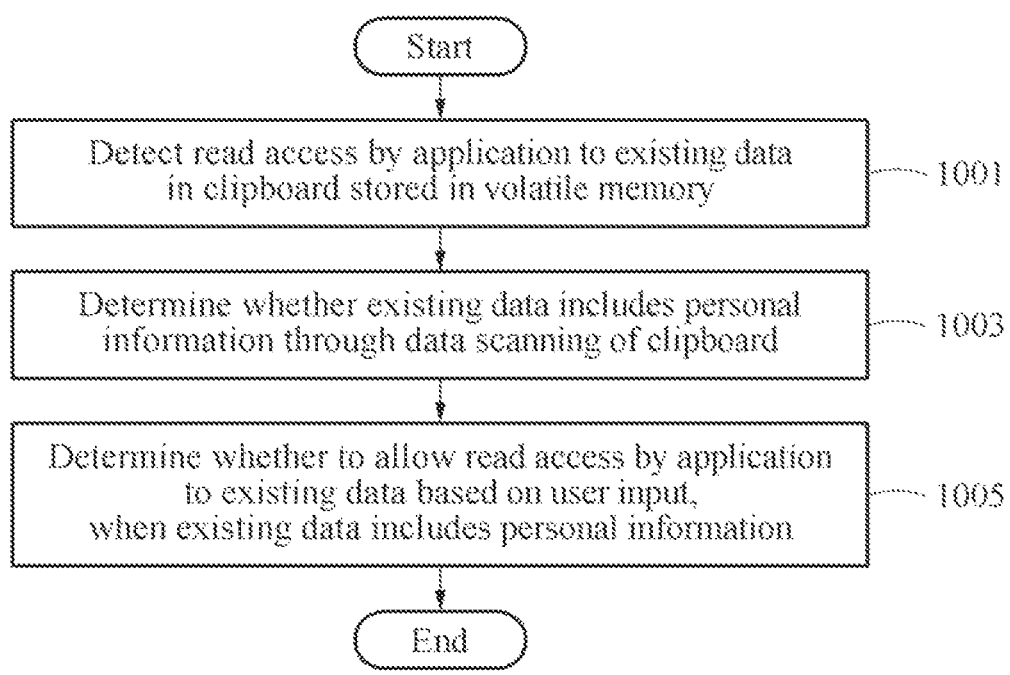
FIG. 10 is a flowchart illustrating a method of controlling a clipboard by an electronic device according to an example embodiment.

FIG. 10 is a flowchart illustrating a method of controlling a clipboard by an electronic device according to an example embodiment.

According to an example embodiment, in operation 1001, a processor (e.g., the processor 401 of FIG. 4) may detect a read access to existing data included in a clipboard stored in a volatile memory (e.g., the volatile memory 405 of FIG. 4) by an application (e.g., the application 246 of FIG. 2).

According to an example embodiment, in operation 1003, the processor 401 may determine whether the existing data includes personal information through data scanning of the clipboard.

According to an example embodiment, when the existing data includes the personal information, the processor 401 may determine whether to allow the read access to the existing data by the application based on a user input in operation 1005.

According to an example embodiment, a method of controlling a clipboard may include operation 1001 by which a processor (e.g., the processor 120 of FIG. 1 or the processor 401 of FIG. 4) detects a read access by an application to existing data included in the clipboard stored in a volatile memory (e.g., the volatile memory 132 of FIG. 1 or the volatile memory 405 of FIG. 4), operation 1003 by which the processor determines whether the existing data includes personal information through data scanning of the clipboard, and operation 1005 by which the processor determines whether to allow the read access by the application to the existing data based on a user input when the existing data includes the personal information.

What is claimed is:

1. An electronic device comprising:
a display;
a volatile memory comprising a first storage area configured to store a clipboard including existing data;
an input interface; and
at least one processor communicably coupled to the display, the volatile memory, and the input interface,
wherein the at least one processor is configured to:
detect a read access to the existing data included in the clipboard by an application,
determine whether the existing data includes personal information,
based on determining that the existing data includes the personal information, control the display to display a window for providing options for the read access, wherein the options include a first option to allow the read access by the application, a second option to deny the read access by the application, and a third option to display the existing data included in the clipboard, and
based on a first input that is provided through the input interface and selects an option among the options for the read access, perform an operation among a first operation of allowing the read access to the existing data by the application, a second operation of denying the read access to the existing data by the application and a third operation of controlling the display to display the existing data included in the clipboard, wherein the first operation corresponds to the first option, the second operation corresponds to the second option, and the third operation corresponds to the third option.

2. The electronic device of claim 1, further comprising a non-volatile memory,
wherein the at least one processor is further configured to determine whether the existing data includes the personal information by data scanning of the clipboard, based on personal information format data stored in the non-volatile memory, and
wherein the personal information format data comprises data associated with a format in which the personal information is represented or stored.

3. The electronic device of claim 1, wherein the at least one processor is further configured to store metadata indicating that the existing data includes the personal information when the existing data includes the personal information.

4. The electronic device of claim 1, wherein the at least one processor is further configured to determine whether the existing data includes the personal information by data scanning of the clipboard,
wherein the volatile memory further comprises a second storage area on which the data scanning is not performed, and
wherein the at least one processor is further configured to move the existing data on which the data scanning is performed to the second storage area on which the data scanning is not performed.

5. The electronic device of claim 1, wherein the at least one processor is further configured to control the display to display the existing data included in the clipboard using a window manager included in middleware, based on the first input selecting the third option.

6. The electronic device of claim 1, wherein the at least one processor is further configured to, based on the first input selecting the second option, delete the existing data from the clipboard and store the existing data in a third storage area that is not accessible via the clipboard.

7. The electronic device of claim 1, wherein the at least one processor is further configured to allow the read access to the existing data by the application once or always, delete the existing data from the clipboard, and store the existing data in a third storage area that is not accessible via the clipboard, based on a second input provided through the input interface.

8. The electronic device of claim 1, wherein the at least one processor is further configured to allow the read access to the existing data by the application, delete the existing data from the clipboard, encrypt the existing data, and store the encrypted existing data in a third storage area that is not accessible via the clipboard, based on a second input provided through the input interface.

9. An electronic device comprising:
a display;
a volatile memory including a first storage area configured to store a clipboard;
an input interface; and
at least one processor communicably coupled to the display, the volatile memory and the input interface,
wherein the at least one processor is configured to:
detect a write access of input data to the clipboard by an application,
determine whether the application is in a background state or a foreground state,
based on the application being in the foreground state, determine whether the input data includes personal information,
based on determining that the input data includes the personal information, control the display to display a window for providing options for the write access, wherein the options include a first option to disallow an input of the input data, a second option to securely store the input data, and a third option to store the input data in the clipboard, and
based on a first input that is provided through the input interface and selects an option among the options for the write access, perform an operation among a first operation of disallowing the input of the input data, a second operation of securely storing the input data, and a third operation of storing the input data in the clipboard, wherein the first operation corresponds to the first option, the second operation corresponds to the second option, and the third operation corresponds to the third option.

10. The electronic device of claim 9, further comprising a non-volatile memory,
wherein the at least one processor is further configured to determine whether the input data includes the personal information based on personal information format data stored in the non-volatile memory, and
wherein the personal information format data comprises data associated with a format in which the personal information is represented or stored.

11. The electronic device of claim 9, wherein the at least one processor is further configured to, based on determining that the input data includes the personal information, store metadata indicating that the input data includes the personal information.

12. The electronic device of claim 9, wherein the at least one processor is further configured to, based on the application being executed in a background, determine one of whether to allow the write access to the clipboard by the application once, whether to allow the write access to the clipboard by the application always, and whether to disallow the write access, based on the first input provided through the input interface.

13. The electronic device of claim 9, wherein the at least one processor is further configured to store metadata indicating that the input data is disposable data, and store existing data of the clipboard in a third storage area that is not accessible via the clipboard, based on the first input selecting the second option.

14. The electronic device of claim 9, wherein the at least one processor is further configured to store existing data of the clipboard in a third storage area that is not accessible via the clipboard, based on the first input selecting the second option.

15. The electronic device of claim 9, wherein the at least one processor is further configured to store the input data in the clipboard based on the first input selecting the third option.

16. A method of controlling access to a clipboard, the method comprising:
detecting, by a processor, a read access to existing data included in the clipboard by an application, the clipboard being stored in a volatile memory;
determining, by the processor, whether the existing data includes personal information;
based on determining that the existing data includes the personal information, displaying, by a display, a window for providing options for the read access, wherein the options include a first option to allow the read access by the application, a second option to deny the read access by the application, and a third option to display the existing data included in the clipboard; and
based on an input that is provided through an input interface and selects an option among the options for the read access, performing an operation among a first operation of allowing the read access to the existing data by the application, a second operation of denying the read access to the existing data by the application and a third operation of controlling the display to display the existing data included in the clipboard, wherein the first operation corresponds to the first option, the second operation corresponds to the second option, and the third operation corresponds to the third option.

17. The method of claim 16, wherein the determining whether the existing data includes the personal information comprises determining whether the existing data includes the personal information based on personal information format data stored in a non-volatile memory.

18. The method of claim 16, further comprising:
based on determining that the existing data includes the personal information, storing metadata indicating that the existing data includes the personal information.

19. The method of claim 16, wherein the determining whether the existing data includes the personal information comprises determining whether the existing data includes the personal information through data scanning of the clipboard, and
wherein the method further comprises:
moving existing data on which the data scanning is performed to a second storage area included in the volatile memory on which the data scanning is not performed.

* * * * *